July 27, 1965 L. E. THOMAS ETAL 3,197,196
STYLUS ASSEMBLY
Filed April 26, 1963 2 Sheets-Sheet 1
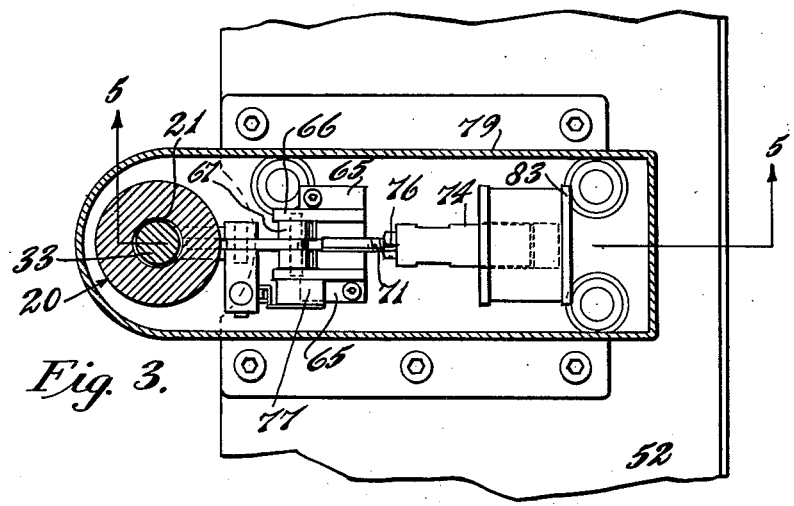
Fig. 3.
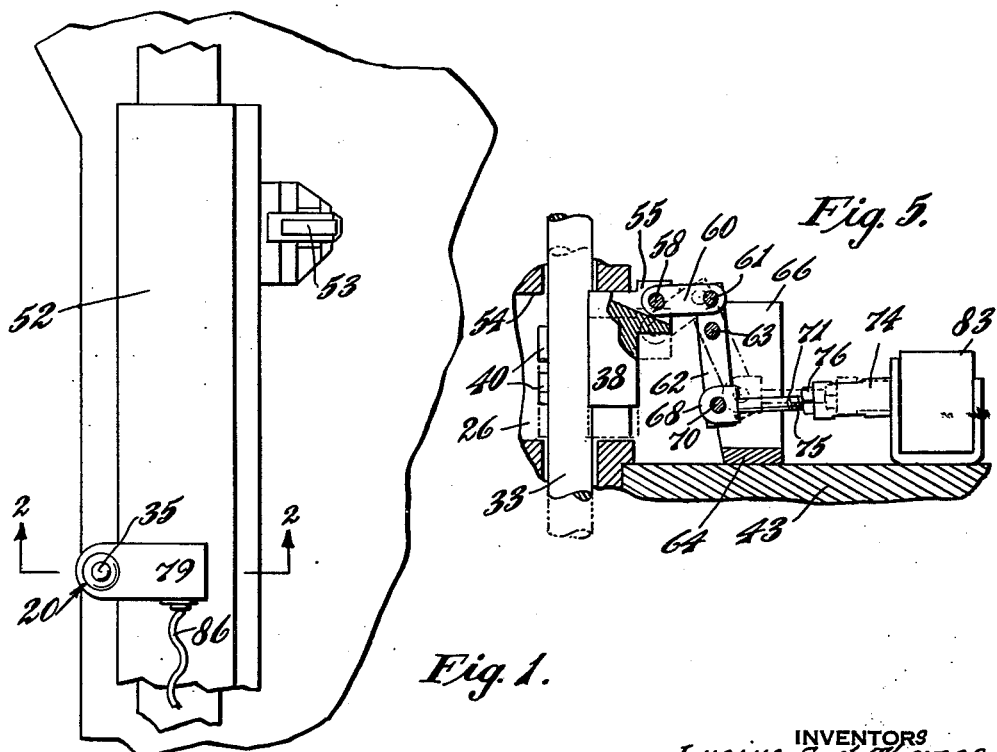
Fig. 5.
Fig. 1.
INVENTORS
Lucius Earl Thomas
Walton Rainey
ATTORNEYS

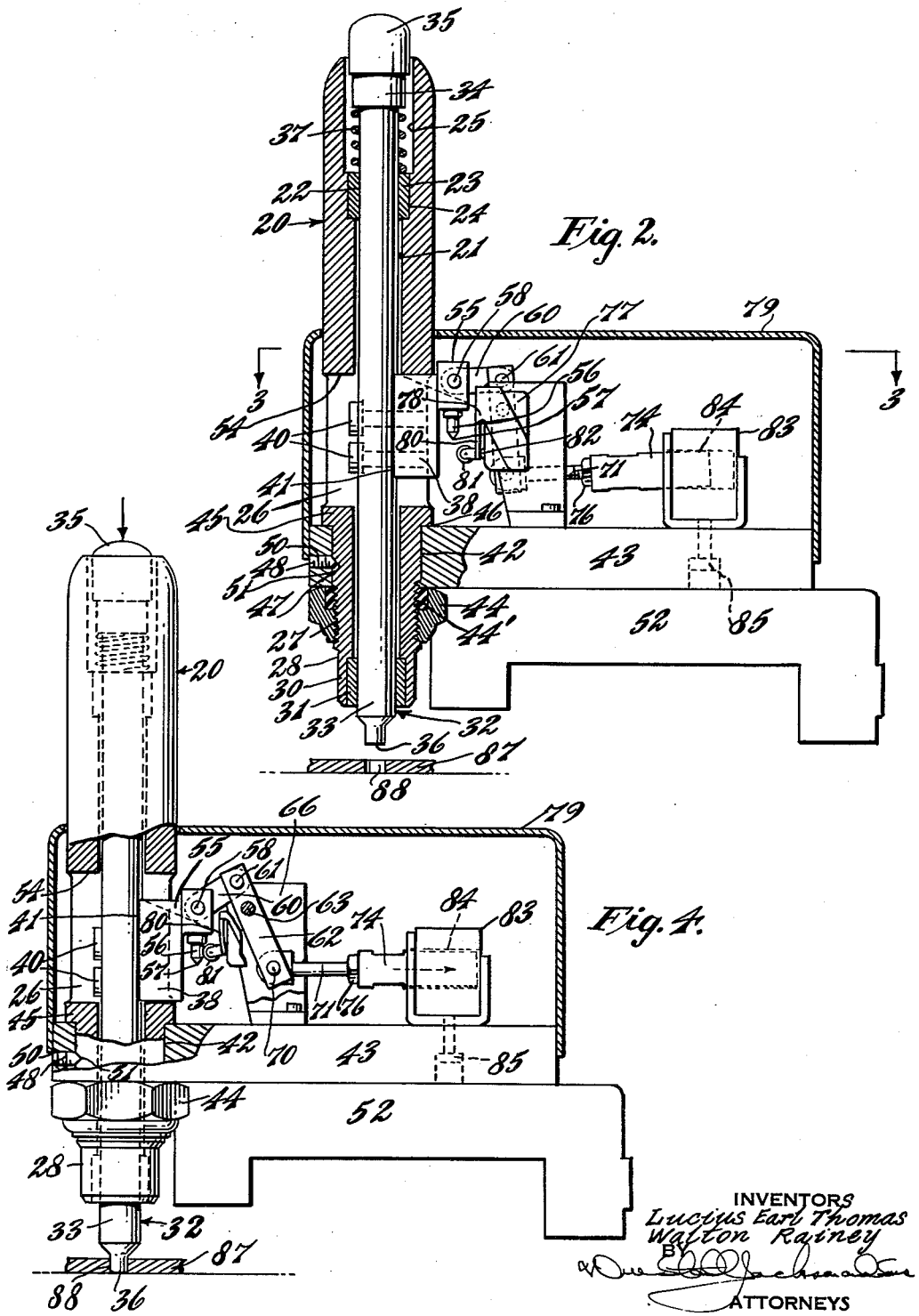

United States Patent Office 3,197,196
Patented July 27, 1965

3,197,196
STYLUS ASSEMBLY
Lucius Earl Thomas, Norristown, and Walton Rainey, Ardmore, Pa., assignors, by mesne assignments, to The Warner & Swasey Company, Cleveland, Ohio, a corporation of Ohio
Filed Apr. 26, 1963, Ser. No. 275,868
7 Claims. (Cl. 269—74)

The present invention relates to workpiece positioning devices and especially to stylus assemblies for use on gauging tables used with machine tools such as turret punch presses.

A purpose of the invention is to prevent shifting of the workpiece in a machine tool prior to the work operation on the piece.

A further purpose is to hold a stylus in a down position on a template until the completion of the work cycle.

A further purpose is to automatically release the stylus at the end of the work cycle to an upward position out of contact with the work template.

A further purpose is to energize a solenoid when the stylus is in a down position whereby the solenoid holds the stylus in a downward position.

A further purpose is to utilize a longitudinally moving armature in a solenoid coil.

Further purposes appear in the specification and in the claims.

In the drawings we have chosen to illustrate one only of the numerous embodiments in which our invention may appear, selecting the form shown from the standpoints of convenience in illustration, satisfactory operation and clear demonstration of the principles involved.

FIGURE 1 is a plan view of the cross slide showing the stylus assembly mounted in position.

FIGURE 2 is an enlarged section on the line 2—2 of FIGURE 1.

FIGURE 3 is a plan section on the line 3—3 of FIGURE 2.

FIGURE 4 is a section similar to FIGURE 2 with part of the microswitch and bracket broken away and showing the stylus pushed down and the armature of the solenoid inserted in the coil of the solenoid.

FIGURE 5 is a section taken on the line 5—5 of FIGURE 3 showing the mechanical linkage.

Describing in illustration but not in limitation and referring to the drawings:

Stylus assemblies wherein a stylus or pointed shaft is mounted slidably longitudinally to engage openings in a workpiece to position workholders are frequently used in machine tool operations. The workpiece is held in the machine tool so that a given machine operation such as punching takes place at a location on the workpiece which is determined by a corresponding opening in the template which is engaged by the stylus. In operation, the stylus assembly which usually includes a sleeve is brought into the position over the opening in the template and the stylus is manually pushed downward into engagement with the template opening to exactly fix the stylus position and hence the workpiece location with respect to the template. The stylus and workpiece are interconnected. The machine operation is then performed.

It has been found that the operator after engaging the stylus in the template opening has a normal tendency to release the stylus whereby the stylus is urged upward under the action of a helical compression spring, and out of engagement with the template. Hence, the workpiece at this point may be dislocated from its original correct position prior to the actual machine operation, for instance, prior to the punching. This results in an incorrect and misplaced operation on the workpiece.

In the present invention, the stylus is automatically held in engagement with the template opening until the completion of the work operation on the workpiece and then is automatically released. The operator merely manually presses the stylus into engagement with the template opening and then releases his pressure on the stylus. Instead of retracting, the stylus is held depressed within the template until the machine operation on the workpiece is completed, upon which the stylus automatically is released from the template opening.

Considering the form shown in the drawings, the stylus assembly consists of a sleeve 20 having a cylindrical bore 21 which passes axially through the sleeve 20. At one end 22 of the bore 21, a bushing 23 is fitted into an annular recess 24. An increased diameter cylindrical portion 25 is formed at the upper end of the sleeve.

A groove or slot 26 extending diametrically through the sleeve 20 is formed at a point slightly below the center of the sleeve 20. The sleeve 20 has threads 27 on the outer circumference at the lower end at 28 and a recessed portion 30 at the lower end of the bore 21 which receives a bushing 31.

A stylus 32 comprising a shaft portion 33, a shoulder portion 34, a head 35 and a point 36 slides in the bore of the sleeve. The stylus 32 is engaged at the shaft 33 by the bushings 23 and 31 at the upper and lower end of the sleeve 20. A helical compression spring 37 engages the shoulder portion 34 at one end and the bushing 23 at the other end to bias the stylus 32 in an upward direction in the sleeve 20.

A bracket 38 is held to the stylus by cap screws 40. The bracket 38 at the portion 41 in contact with the stylus shaft 33 conforms in curvature to the shaft 33.

The stylus sleeve 20 passes through an opening 42 in bracket plate 43 and is held thereto by a lock nut 44 having an elastic jam portion 44' which keeps a shoulder 45 of the stylus sleeve 20 in engagement with the surface 46 of the plate 43. The opening 42 in the plate conforms to the diameter of the sleeve 20 at location 47 so that a snug fit is created. A set screw 48 threaded in the plate 43 at 50, and having a point 51, engages the stylus sleeve 20 and holds the stylus sleeve 20 from rotation with respect to the plate 43. The plate 43 itself is bolted to the workpiece 52, which in this instance is a cross slide of a gauge table having work clamps 53, one of which is shown (FIGURE 1).

It should be understood that the stylus is free to move over the template which is normally fixed in position and the stylus through its connection with the work supporting member moves the work with respect to the machine tool.

It will be seen that the stylus is restrained in its upper movement by engagement of the bracket 38 with the end of the slot at 54 in the stylus sleeve 20.

The bracket has a latch 55 suitably integral therewith which has fixed in position a contact screw 56 having a pointed end 57. The latch has pivoted thereto at 58 one end of a link 60 which is pivoted at the other end at 61 to link 62. Link 62 is pivoted at 63 to a U shape bracket 64 having flanges 65. The flanges 65 of the U bracket 64 are bolted to the plate 43. The pivot 63 extends from the arms 66 of the U 65 and allows link 62 to rotate. Spacers 67 are placed along the pivot to position the link between the arms 66 of the U.

At the lower end of link 62, a clevis screw 68 is pivotally connected at 70. The clevis screw 68 has a shaft 71 which is threaded into armature 74. Adjustment is provided between clevis screw 68 and armature 74 by means of threads 75 which engage a threaded hole in the armature. A lock nut 76 is tightened on the threads 75 to fix the adjustment.

A microswitch 77 is fixed to arm 66 of the U as by screws or the like. An actuator 78 having a spring arm 80 and a roller follower 81 fixed on the switch is adapted to contact a point 82. The spring arm 80 is normally out of contact with the contact point 82 so that the switch is normally open. Suitable electrical leads are connected to the microswitch as later explained.

A cover 79 is positioned over the linkage and switch mechanism in any suitable manner.

A solenoid coil 83 having a bore 84 which extends longitudinally with respect to armature 74 is fixed to the plate 43 by means of cap screws 85 so that the armature 74 is free to travel longitudinally within the bore 84 when the coil is deenergized.

Electric current is supplied through microswitch 77 to the solenoid coil 83 by coiled lead conductor 86 as seen in FIGURE 1. The lead conductor 86 is connected to a source of current supply.

In operation, the stylus 32 is normally in an upward position as seen in FIGURE 2. The operator suitably grasps the stylus sleeve 20 and moves the entire assembly over the template 87 by sliding the work holding device 52 to which the stylus is attached. When the stylus 32 is over the desired template opening 88 in the template, the operator exerts manual force downward on the stylus head 35 as seen in FIGURE 4. The stylus point 36 enters the stylus opening 88, thus fixing the position of the workpiece in a location which corresponds to the template opening 88.

As the stylus moves from the up position of FIGURE 2 to the down position of FIGURE 4, the bracket 38 and integral latch 55 also move downward. Link 60 pivoted at 58 on the latch 55 is pulled downward at 58, causing link 60 at the other end at pivot point 61 to rotate link 62 on pivot 63 in a counterclockwise direction as viewed in FIGURES 2 and 4. This is shown in phantom in FIGURE 5. The lower end of link 62 pivotally moves clevis screw 68 longitudinally toward the solenoid coil 83 so that the armature 74 which is fixed to link 72 is mechanically moved into the bore 84 of the solenoid coil 83.

At the bottom of the stylus 32 travel from the up position of FIGURE 2 to the down position of FIGURE 4, the contact screw 56 engages the roller follower 81 of the microswitch 77 and forces the spring contact arm 80 into engagement with the contact point 82, thus closing the circuit through the microswitch and energizing the solenoid coil 83.

The armature 74 is held within the solenoid coil 83 since the coil is energized by current which passes through the coil 83 when the microswitch 77 is in a closed position as shown in FIGURE 4. The operator is now free to release his physical force on the stylus head 30 and actuate the machine operation on the workpiece without any danger of the workpiece moving since the stylus head 35 is fixed in the template. It should be understood that in some instances it may be desirable to have the machine automatically perform its sequence of operations once the stylus is depressed. In this arrangement the microswitch 77 will close a circuit which will activate the machine cycle. The current to the solenoid coil 83 will then be interrupted at the end of the machine cycle.

After the work operation is completed, a suitable circuit breaker on the machine interrupts the current to the solenoid coil 83, deenergizing it, whereby the helical spring 37 forces the stylus upward opening the microswitch 77. The stylus 32 in its upward travel causes pivot 58 on link 60 to move upward whereby link 62 is rotated clockwise and armature 74 is withdrawn from the solenoid coil 83. The cycle is now ready to be repeated.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. In a stylus assembly, a stylus sleeve, a bore within the sleeve, a stylus slidably mounted within the bore and biased in an upward position, a solenoid coil, a solenoid armature movable generally longitudinally within said solenoid coil, connecting means between the stylus and the armature whereby the armature is moved within the coil when the stylus is in a downward position and out of the coil when the stylus is in an upward position, and switch means for energizing the coil when the stylus is moved into the down position.

2. A stylus assembly of claim 1, wherein the stylus is biased in an upward position by a helical compression spring.

3. A stylus assembly of claim 1, wherein the switch means are activated by the stylus.

4. A stylus assembly comprising a stylus adapted to slide vertically within a stylus sleeve, means for biasing said stylus upward in said sleeve, an armature, a solenoid coil, linkage means for translating the armature within the solenoid coil, and electrical means including switch means adapted to be closed when the stylus is in a down position whereby current passes to the coil and energizes the coil whereby the armature is held within the coil and the stylus is held in a down position.

5. In a stylus assembly for positioning a workpiece corresponding to a template opening, a stylus sleeve, a stylus slidable within the sleeve, an armature, a solenoid coil, connecting means between the stylus and the armature for passing the armature within the solenoid coil when the stylus travels to a down position, a switch, an abutment on the stylus adapted to close the switch when the stylus is in a down position and thereby energize the solenoid.

6. In a stylus assembly, a stylus sleeve, a stylus biased upward and adapted to slide within the sleeve, an armature, a solenoid coil, mechanical means interconnected between the stylus and the armature for moving the armature within the solenoid coil when the armature is depressed and electrical means for energizing the solenoid coil and holding the armature within the coil whereby the stylus is held in a depressed position.

7. In a stylus assembly, a stylus sleeve having a bore and a slot, a stylus including a shaft and having a point end and a head end within the stylus sleeve and adapted to slide vertically in the bore, a helical spring biasing the stylus upward and abutting at one end on the stylus and at the other end against the stylus sleeve, a bracket fixed on the stylus shaft and adapted to slide in the slot, a first link connected to the bracket, a second link connected to the first link, an armature connected to the second link and adapted to slide generally longitudinally within a solenoid coil, and switch means adapted to be closed by the bracket so that the coil is energized, whereby the armature is mechanically moved within the solenoid manually and then held within the solenoid electrically.

References Cited by the Examiner

UNITED STATES PATENTS 3,116,665    1/64    Reisner _____ 90—13.05

WILLIAM W. DYER, Jr., *Primary Examiner.*

ROBERT C. RIORDON, *Examiner.*